April 15, 1969     A. J. BOSSERT, JR     3,438,259
VACUUM SYSTEM PRESSURE CHANGE DETECTION
Filed May 31, 1967
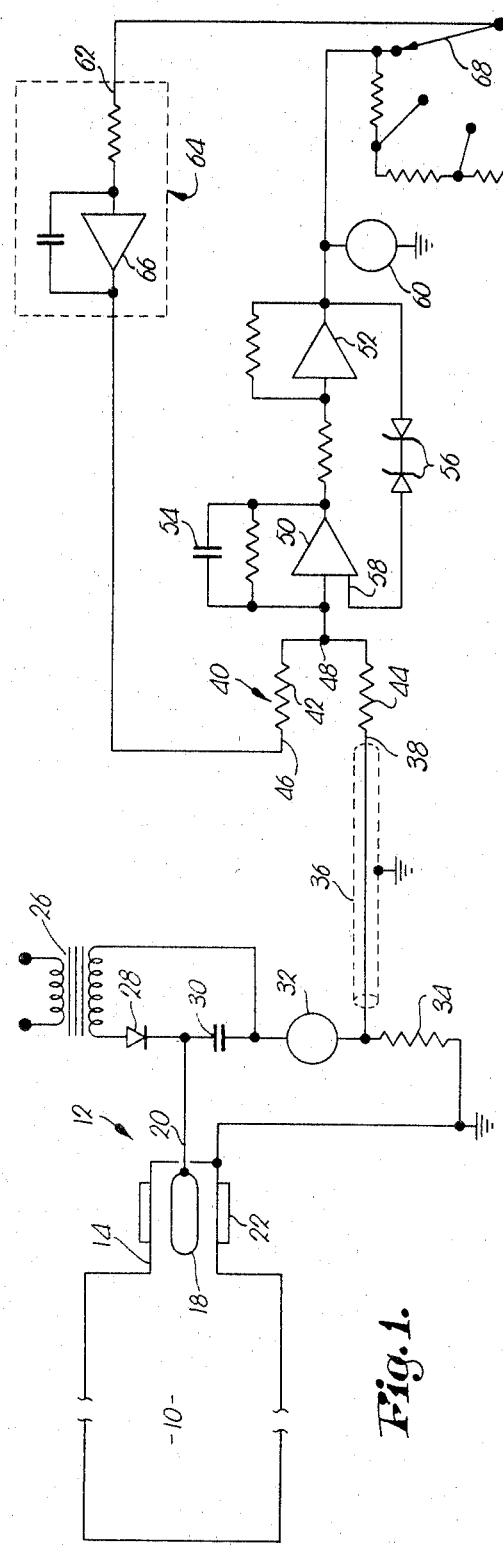
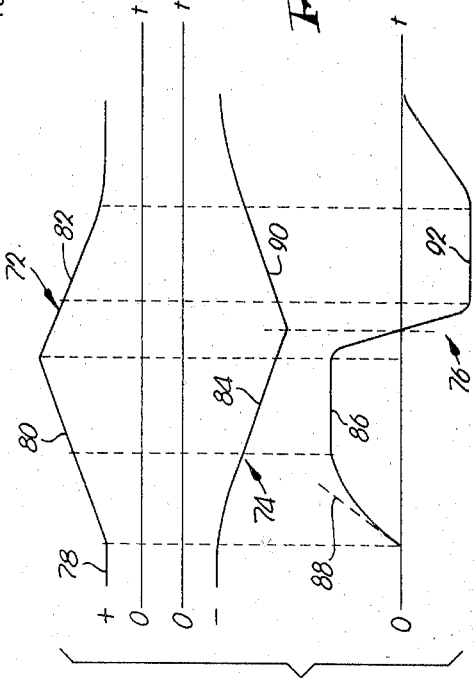
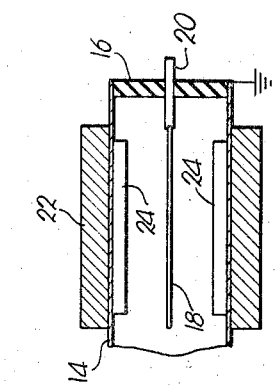
INVENTOR
Alfred J. Bossert Jr.
BY Schmidt, Johnson, Hovey,
Williams & Bradley
ATTORNEYS United States Patent Office 3,438,259
Patented Apr. 15, 1969

3,438,259
VACUUM SYSTEM PRESSURE CHANGE DETECTION
Alfred J. Bossert, Jr., Kansas City, Mo., assignor to Midwest Research Institute, Kansas City, Mo., a corporation of Missouri
Filed May 31, 1967, Ser. No. 642,553
Int. Cl. G01l 9/00; G01n 27/00
U.S. Cl. 73—398                                    12 Claims

ABSTRACT OF THE DISCLOSURE

A bucking voltage is combined with the pressure-dependent signal from an electronic vacuum gauge to eliminate the portion of such signal representing a previous pressure condition in order to determine whether the pressure is increasing or decreasing. The combined signal is metered so that its amplitude may be observed and is fed to an integrator having a predetermined lag time. The integrator output is the bucking voltage; therefore, the meter reading effectively represents the differential of the gauge signal to provide an indication of the rate of change of the pressure.

---

In order to find a leak in a vacuum system a gas-emitting probe is held in close proximity to the various couplings, etc. of the system where the leak is suspected. During the probing procedure it has been the practice to utilize a vacuum leak detector coupled with the electronic vacuum gauge which monitors the pressure of the system. Heretofore, such leak detectors have employed a manually adjusted "bucking" voltage mixed with the pressure-dependent signal from the gauge and applied to the input of a sensitive null detector. The null detector displays very small changes of the composite voltage at its input as the gas from the probe is admitted into the vacuum system. Although slight changes from the reading of the vacuum gauge are produced by the admitted gas, such changes are normally visually undetectable, thereby requiring that auxiliary equipment be utilized in order to detect the pressure change that occurs when the leak is located by the probe.

In the use of a leak detector of the type briefly discussed above, the adjustment of the bucking voltage is critical to the performance of the detector. Such adjustment is made on a hit-and-miss basis with no real assurance that a proper setting has been made. Manifestly, as the pressure of the system increases or decreases, the bucking voltage must change or the detector will no longer indicate the pressure variations relative to the changed pressure condition.

It is, therefore, the primary object of this invention to provide a method and an apparatus for detecting a small pressure change in a vacuum system which are not subject to the disadvantages mentioned above.

As a corollary to the foregoing object, it is an important aim of the instant invention to detect the rate of change of the system pressure so that the indication thus given will be independent of the degree to which the pressure in the system ultimately changes.

A further and important object of the invention is to provide a method and apparatus for automatically producing a bucking voltage which lags the pressure-dependent signal from the vacuum gauge to thereby obviate the need to manually adjust such voltage and avoid the inconsistencies discussed above.

Still another important object of this invention is to provide a leak detector for a vacuum system utilizing an integrator with a variable response rate in a manner to effectively differentiate the pressure-dependent signal from the vacuum gauge.

In the drawing:
FIGURE 1 is a diagrammatic representation of a vacuum system and an electrical schematic diagram of the vacuum gauge and the leak detector;
FIG. 2 is an enlarged, diagrammatic, longitudinal sectional view of the structure of the vacuum gauge which effects the glow discharge; and
FIG. 3 comprises a set of wave form diagrams illustrating the operation of the instant invention.

An evacuated chamber is diagrammatically illustrated at 10 and comprises a part of a vacuum system employing the usual pumping apparatus and necessary vacuum connections (not shown). A suitable ionization gauge, glow discharge gauge, or ion pump for producing a pressure-dependent, unidirectional electrical signal would be employed with the vacuum system to provide a means of monitoring the pressure thereof. A glow discharge gauge is selected for illustration herein and may comprise a Penning vacuum gauge 12 provided with a tube 14 having one of its ends communicated with chamber 10. The opposite end is closed by a dielectric member 16 which serves as a mount for a conductive loop 18 attached to a terminal 20.

Tube 14 is of nonmagnetic material and is encircled by a permanent magnet 22, a pair of elongated, diametrically opposed pole pieces 24 being longitudinally disposed in tube 14 in the field of magnet 22. Terminal 20 is connected to one side of the output of a high voltage DC power supply illustrated by a step-up transformer 26 and a diode rectifier 28 connected to the secondary of transformer 26. The output is taken across a filter capacitor 30, and a microammeter 32 and a series resistor 34 complete the circuit to the ground side. Tube 14 is grounded and hence a glow discharge occurs under high vacuum conditions between loop 18 and the wall of tube 14. The field of magnet 22 is employed in the usual manner to sustain the glow discharge at very low pressures.

The pressure-dependent voltage appearing across resistor 34 is introduced to the detector of the instant invention by a coaxial cable 36 which connects the ungrounded side of resistor 34 to one input 38 of a summing network 40 comprising a pair of resistors 42 and 44. Resistor 44 presents the input 38, and resistor 42 presents an input 46 of summer 40, the output thereof being taken at 48 at the interconnection of resistors 42 and 44.

A pair of high-gain, analog computer amplifiers 50 and 52 are cascaded in series and are connected to summer output 48. The capacitor 54 illustrated in conjunction with amplifier 50 forms a high frequency feedback loop for gain stabilization and noise suppression. A Zener diode protection configuration 56 connects the output of amplifier 52 to the reference input 58 of amplifier 50. The reference input 58 of amplifier 50 is in phase with the output thereof; however, a 180° phase shift is realized from the signal input to the output of each amplifier, thereby requiring that two amplifier stages be employed in order that the amplified output signal from amplifier 52 will be in phase with the input signal received from summer output 48.

A zero-centered direct current voltmeter 60 is connected across the output of amplifier 52 as indicated by the ground notation, the amplifier output also being connected to the input 62 of an integrator 64 employing an analog computer amplifier 66. A rotary switch 68 is interposed in series between the output of amplifier 52 and the integrator input 62, and forms a multiple contact, variable voltage divider having five voltage selections. Five series connected resistors 70 constitute the voltage divider and are connected between the contacts of rotary switch 68 as illustrated.

The operation of the instant invention is best understood with reference to FIG. 3. Wave form 72 illustrates the signal from the Penning gauge 12 appearing across resistor 34. Wave form 74 illustrates the signal at the output of integrator 64 which is fed to the input 46 of summer 40. Wave form 76 illustrates the signal appearing at the output of amplifier 52 and registered by voltmeter 60. All wave forms are voltage plots against time as the abscissa.

The constant portion 78 of wave form 72 represents the equilibrium vacuum in the system reached with a leak present, prior to any probing to determine the location of the leak. The positive-going, linear ramp 80 of wave form 72 shows the pressure increasing and illustrates that the probe has located the leak in the system, a gas such as helium from the probe being introduced thereinto at a constant rate. As a double check on the leak location, the negative-going ramp 82 of wave form 72 shows the pressure decreasing after the probe is withdrawn.

At the equilibrium pressure condition the signal delivered to input 38 is exactly offset by a bucking voltage produced by integrator 64 and fed to input 46 of summer 40. Thus, the summation signal appearing at summer output 48 is at zero level and, accordingly, zero voltage is registered by meter 60. It should be understood that integrator 64 is charged in response to the signal from Penning gauge 12 when the detector is connected to the gauge output appearing across resistor 34 prior to probing. The integrator output is of opposite polarity to the gauge output by virtue of the 180° phase shift in amplifier 66, since the signal at integrator input 62 is in phase with the gauge signal.

The position of switch 68 determines the sensivity of the detector; specifically, the response of integrator 64 to the signal delivered to its input 62. Such integrator response represents a certain lag time which may be expressed in terms of millivolts per second. For example, the fast response setting illustrated may be 500 mv./sec. with the other switch positions corresponding to 150, 50, 15 and 5 mv./sec. respectively.

The degree of change in the pressure of the system illustrated by wave form 72 is greatly exaggerated for clarity of illustration. As the pressure increases when the leak is located (ramp 80), integrator 64 responds and its output signal has an amplitude variation characteristic which lags variations in the amplitude of the gauge signal by a predetermined time duration dependent upon the setting of switch 68. Ultimately, a negative-going ramp 84 is produced which increases at the same rate that ramp 80 is increasing. During this time, summer 40 delivers a summation signal at its output 48 which has an amplitude variation characteristic representing the rate of change of the amplitude of the gauge signal at input 38 with respect to the amplitude of the integrator output (bucking voltage) fed to input 46. Such summation signal is illustrated in amplified form by wave form 76, the latter having a flat top portion 86 coinciding with the ramps 80 and 84 of the gauge signal and the bucking voltage. (The broken line 88 in the graph of wave form 76 illustrates the response in the absence of the bucking voltage provided by integrator 64, the response being in the form of a positive-going ramp steeper than ramp 80 due to the amplification.) It may be appreciated, therefore, that the level portion 86 of wave form 76 obtained after the expiration of the integrator lag time indicates that the rate of change of the pressure of the system is constant and, furthermore, since the signal is positive, that the pressure is increasing.

During the decline in system pressure represented by ramp 82 which occurs once the probe is withdrawn from the leak location, the amplitude of the bucking voltage follows and has a positive-going ramp 90. The amplitude of the bucking signal over the time period represented by ramp 90 decreases at the same rate that the gauge signal is decreasing to produce a second constant level 92 in wave form 76 of opposite polarity to the previous constant portion 86. Thus, as a double check, the technician is made aware of the decreasing pressure after withdrawal of the probe. The time duration represented by the wave forms would normally, for example, be on the order of from 10 seconds to approximately a minute or so.

It is, of course, important to the self-balancing feature of the instant invention that, under equilibrium conditions with no pressure change, the summation signal at summer output 48 be zero. Thus, due to the amplification effected by amplifiers 50 and 52, the amplification factor of integrator amplifier 66 is selected of a value much less than unity to exactly offset the amplification imparted by the previous stages. It may be appreciated, therefore, that the voltmeter 60 measures a signal (wave form 76) which, when integrated, differs from the gauge signal appearing at input 38 by the amplification factor of amplifiers 50 and 52. In this manner, the gauge signal is effectively differentiated as illustrated by the constant portions 86 and 92 of wave form 76 which reflect the constant rate of change, increasing and decreasing, of the pressure in the instant example.

Having thus described the invention, what is claimed as new and desired to be secured by Letters Patent is:

1. A method of detecting a small pressure change in a vacuum system, said method comprising the steps of:
   providing a first electrical signal representing the pressure of said system and having an amplitude which varies in accordance with changes in said pressure;
   deriving a second electrical signal from said first signal having an amplitude variation characteristic which lags variations in the amplitude of said first signal by a predetermined time duration,
   said deriving of the second signal including combining said signals to produce a third electrical signal having an amplitude variation characteristic representing the rate of change of the amplitude of said first signal with respect to the amplitude of said second signal, whereby an increase or a decrease in the amplitude of said third signal corresponds to an increase or a decrease, respectively, in the rate of change of said pressure; and
   sensing the amplitude of said third signal to thereby determine the rate of change of said pressure.

2. The method as set forth in claim 1,
   said deriving of the second signal further including providing the latter with a polarity opposite to the polarity of said first signal.

3. The method as set forth in claim 2,
   said combining of the first and second signals including algebraically summing the same.

4. The method as set forth in claim 3, wherein said first signal is unidirectional and wherein is provided the additional step of:
   sensing the polarity of said third signal to thereby determine whether said pressure is increasing or decreasing.

5. The method as set forth in claim 2,
   said first signal being unidirectional,
   said combining of the first and second signals comprising algebraically summing the same to provide a summation signal, and amplifying said summation signal to produce said third signal,
   said deriving of the second signal further including integrating said third signal and providing the integrated signal with a reduced amplitude offsetting the amplitude increase effected in amplifying said summation signal.

6. The method as set forth in claim 1,
   said deriving of the second signal further including integrating said third signal.

7. The method as set forth in claim 6,
   said deriving of the second signal further including providing the latter with a polarity opposite to the polarity of said first signal, said combining of the first and second signals including algebraically summing the same.

8. In a vacuum system provided with a pressure measuring device for producing an electrical signal representing the pressure of said system and having an amplitude which varies in accordance with changes in said pressure, apparatus for use with said device to detect small pressure changes comprising:

a summing means having a first input for receiving said pressure-representing signal, a second input, and an output for delivering a summation signal;

circuit means coupled with said output and responsive to said summation signal for producing a bucking signal having a polarity opposite to the polarity of said pressure-representing signal and having an amplitude variation characteristic which lags variations in the amplitude of said pressure-representing signal by a predetermined time duration;

means coupling said circuit means with said second input for exciting the latter with said bucking signal, whereby said summation signal has an amplitude variation characteristic representing the rate of change of the amplitude of said pressure-representing signal with respect to the amplitude of said bucking signal, and whereby an increase or a decrease in the amplitude of said summation signal corresponds to an increase or a decrease, respectively, in the rate of change of said pressure; and means coupled with said output for sensing the amplitude of said summation signal to thereby determine the rate of change of said pressure.

9. The invention of claim 8,
said circuit means including an integrator responsive to said summation signal.

10. The invention of claim 9,
said circuit means further including means coupled with said integrator for varying the response thereof to said summation signal, whereby to vary the length of said duration.

11. The invention of claim 9,
and amplifier means coupling said output with said sensing means and with the input of said integrator,
said integrator having an amplification factor less than unity and of a value to offset the increase in the amplitude of said summation signal effected by said amplifier means.

12. The invention of claim 8,
said sensing means being operable to sense the polarity of said summation signal to thereby determine whether said pressure is increasing or decreasing.

References Cited

UNITED STATES PATENTS 2,526,038 10/1950 Nelson.
2,784,373 3/1957 Lawrance et al. __ 73—49.3 XR
3,358,505 12/1967 Andresen _____ 73—179

LOUIS R. PRINCE, *Primary Examiner.*

DONALD O. WOODIEL, *Assistant Examiner.*

U.S. Cl. X.R.
73—49.3; 324—33